United States Patent
Ackley et al.

(10) Patent No.: US 8,202,167 B2
(45) Date of Patent: Jun. 19, 2012

(54) SYSTEM AND METHOD OF INTERACTIVE VIDEO PLAYBACK

(75) Inventors: Jonathan Ackley, Glendale, CA (US); Christopher T. Carey, Santa Clarita, CA (US); Bennet S. Carr, Burbank, CA (US); Kathleen S. Poole, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1834 days.

(21) Appl. No.: 10/860,572

(22) Filed: Jun. 2, 2004

(65) Prior Publication Data

US 2005/0020359 A1    Jan. 27, 2005

Related U.S. Application Data

(60) Provisional application No. 60/475,339, filed on Jun. 2, 2003.

(51) Int. Cl.
*A63F 9/24* (2006.01)
*A63F 13/00* (2006.01)

(52) U.S. Cl. .......................................... 463/43; 463/31

(58) Field of Classification Search .......... 725/1; 463/2, 463/31, 43
See application file for complete search history.

(56) References Cited

U.S. PATENT DOCUMENTS

| | | | |
|---|---|---|---|
| 4,333,152 A | 6/1982 | Best | |
| 4,792,895 A | 12/1988 | Tallman | |
| 4,831,541 A | 5/1989 | Eshel | |
| 5,462,275 A * | 10/1995 | Lowe et al. | 463/4 |
| 5,522,075 A | 5/1996 | Robinson | |
| 5,548,340 A | 8/1996 | Bertram | |
| 5,553,864 A * | 9/1996 | Sitrick | 463/31 |
| 5,606,374 A | 2/1997 | Bertram | |
| 5,634,850 A | 6/1997 | Kitahara | |
| 5,699,123 A | 12/1997 | Ebihara et al. | |
| 5,708,845 A | 1/1998 | Wistendahl | |
| 5,782,692 A | 7/1998 | Stelovsky | |
| 5,818,439 A | 10/1998 | Nagasaka et al. | |
| 5,830,065 A * | 11/1998 | Sitrick | 463/31 |
| 5,892,521 A | 4/1999 | Blossom | |
| 5,893,084 A | 4/1999 | Morgan | |

(Continued)

FOREIGN PATENT DOCUMENTS

EP    0326830    8/1989

(Continued)

OTHER PUBLICATIONS

Halo 54. Airforce Delta Storm Faqs <URL: http://www.gamefaqs.com/console/xbox/file/475157/25199>.*

(Continued)

*Primary Examiner* — Steven J Hylinski
(74) *Attorney, Agent, or Firm* — Farjami & Farjami LLP

(57) ABSTRACT

A method of providing an interactive game through playback of video, the method comprising the steps of providing a video player with a processor, the processor capable of accepting user input, drawing graphics or text on top of video playback, and controlling playback of sounds; providing media with a primary video stream for standard playback, and game instructions working in cooperation with the video stream, and an edit decision list; reading the edit decision list into the CPU and playing the portions of the video stream as instructed by the edit decision list; and superimposing other graphics onto the video to create an interactive game experience.

36 Claims, 17 Drawing Sheets

U.S. PATENT DOCUMENTS

| | | | |
|---|---|---|---|
| 5,929,849 | A | 7/1999 | Kikinis |
| 5,956,092 | A | 9/1999 | Ebihara |
| 5,973,679 | A | 10/1999 | Abbot |
| 5,987,509 | A | 11/1999 | Portuesi |
| 6,069,669 | A | 5/2000 | Park |
| 6,234,896 | B1 * | 5/2001 | Walker et al. .......... 463/16 |
| 6,262,746 | B1 | 7/2001 | Collins |
| 6,362,816 | B1 | 3/2002 | Kawanami |
| 6,373,500 | B1 | 4/2002 | Daniels |
| 6,407,779 | B1 | 6/2002 | Herz |
| 6,493,038 | B1 | 12/2002 | Singh |
| 6,539,240 | B1 | 3/2003 | Watanabe |
| 6,561,906 | B2 * | 5/2003 | Suzuki .......... 463/31 |
| 6,570,587 | B1 | 5/2003 | Efrat et al. |
| 6,868,449 | B1 | 3/2005 | Miyamoto |
| 7,027,101 | B1 | 4/2006 | Sloo |
| 7,043,726 | B2 | 5/2006 | Scheetz |
| 7,051,005 | B1 | 5/2006 | Peinado |
| 7,069,311 | B2 | 6/2006 | Gupta |
| 7,162,531 | B2 | 1/2007 | Paz |
| 7,210,144 | B2 | 4/2007 | Traut |
| 2001/0021926 | A1 | 9/2001 | Schneck |
| 2002/0054049 | A1 | 5/2002 | Toyoda |
| 2002/0056136 | A1 * | 5/2002 | Wistendahl et al. .......... 725/135 |
| 2002/0059456 | A1 | 5/2002 | Ha |
| 2002/0060750 | A1 | 5/2002 | Istvan |
| 2002/0083449 | A1 | 6/2002 | Im |
| 2002/0097280 | A1 | 7/2002 | Loper |
| 2002/0138851 | A1 | 9/2002 | Lord |
| 2002/0141582 | A1 | 10/2002 | Kocher |
| 2002/0161996 | A1 | 10/2002 | Koved |
| 2002/0162117 | A1 | 10/2002 | Pearson |
| 2002/0169987 | A1 | 11/2002 | Meushaw |
| 2002/0184520 | A1 | 12/2002 | Bush |
| 2002/0194612 | A1 | 12/2002 | Lundberg |
| 2003/0046557 | A1 | 3/2003 | Miller |
| 2003/0170011 | A1 | 9/2003 | Otsuka |
| 2003/0190950 | A1 | 10/2003 | Matsumoto |
| 2003/0196100 | A1 | 10/2003 | Grawrock |
| 2004/0005918 | A1 * | 1/2004 | Walker et al. .......... 463/16 |
| 2004/0047588 | A1 | 3/2004 | Okada |
| 2004/0064831 | A1 * | 4/2004 | Abbott et al. .......... 725/1 |
| 2004/0067048 | A1 | 4/2004 | Seo |
| 2004/0133794 | A1 | 7/2004 | Kocher |
| 2004/0175218 | A1 | 9/2004 | Katzer |
| 2004/0268135 | A1 | 12/2004 | Zimmer |
| 2005/0019015 | A1 | 1/2005 | Ackley |
| 2005/0022226 | A1 | 1/2005 | Ackley |
| 2005/0223220 | A1 | 10/2005 | Campbell |
| 2006/0069925 | A1 | 3/2006 | Nakai |
| 2007/0033419 | A1 | 2/2007 | Kocher |

FOREIGN PATENT DOCUMENTS

| | | |
|---|---|---|
| EP | 0982947 | 3/2000 |
| EP | 1304876 | 7/2004 |
| JP | 369154/2002 | 12/2002 |
| WO | WO 01/73525 | 4/2001 |
| WO | WO 01/65832 | 7/2001 |
| WO | WO 02/17643 | 2/2002 |

OTHER PUBLICATIONS

Amer Ajami. Posted: Nov. 14, 2001 AirForce Delta Storm Review <URL: http://www.gamespot.com/xbox/sim/airforcedeltastorm/review.html?om_act=convert&om_clk=tabs&tag=tabs;reviews>.*

Andrew Seyoon Park. Posted: Feb. 11, 2000 The Sims Review <URL: http://www.gamespot.com/pc/strategy/sims/review.html?om_act=convert&om_clk=tabs&tag=tabs;reviews>.*

AirForce Delta Storm Screen shot. <URL: http://www.gamespot.com/pages/image_viewer/frame_lead.php?pid=475157&img=17>.*

Halo 54. Airforce Delta Storm Faqs <http://www.gamefaqs.com/console/xbox/file/475157/25199> Aug. 27, 2003.*

AirForce Delta Storm Screen Shot. <http://www.gamespot.com/pp./image_viewer/frame_lead.php?pid=475157&img=17> Released Nov. 14, 2001.*

Adve, et al., *LLVA: A Low-level Virtual Instruction Set Architecture*, In Proc. 36th Symposium on Microarchitecture, (2003 IEEE).

Kocher, et al., *Self-Protecting Digital Content*, Cryptography Research, Inc., pp. 1-14 (2002-2003).

*Trusted Computing Platform Alliance (TCPA) Main Specification Version 1.1b*, Trusted Computing Group, (Feb. 2002).

Schödl, et al., *Controlled Animation of Video Sprites*, Georgia Institute of Technology college of Computing, pp. 121-127, 196 (2002).

* cited by examiner

SYSTEM AND METHOD OF INTERACTIVE VIDEO PLAYBACK

RELATED APPLICATIONS

This application claims priority to U.S. Provisional Patent Application No. 60/475,339, filed Jun. 2, 2003, which is incorporated herein by reference in its entirety. This application is also related to U.S. Utility patent application Ser. No. 10/859,885, entitled "System And Method Of Programmatic Window Control For Consumer Video Players"; U.S. Utility patent application Ser. No. 10/859,888, entitled "System And Method Of Dynamic Interface Placement Based On Aspect Ratio"; U.S. Utility patent application Ser. No. 10/859,732, entitled "System And Method Of Video Player Commerce"; and U.S. Utility patent application Ser. No. 10/859,887, entitled "Video Playback Image Processing"; all of which are filed concurrently herewith on Jun. 2, 2004, and incorporated by reference herein in their entirety.

BACKGROUND

1. Field

In general, the field of the disclosure relates to digital video control. More specifically, the field of the disclosure relates new systems and methods for providing interactive game or educational experiences.

2. General Background and State of the Art

Interactive multimedia provides for a user to more fully appreciate a subject by exploring the varied multimedia resources available. Interactive multimedia includes the integration of text, audio, graphics, still image and moving pictures into a single, computer-controlled, multimedia product. The desire for interactive multimedia grows along with the desire for increasing data storage for these programs.

DVDs and other digital media players, such as high definition video players and software DVD-ROM, provide an increased amount of data storage and, thus, more avenues for media integration. Increased storage capacity translates into the ability to hold more information on a single disc or drive. In addition to increased storage capacity, this digital media can provide higher quality video and audio.

Although there are many uses for high quality audio and video products, the entertainment industry desires higher quality audio and video, especially in the video game industry. The video game industry desires high quality with low pricing. In order to make a video game based on a movie, the quality of the audio and video often suffered as a result of the cost. In other circumstances, a quality product was produced that was too expensive to make a profit.

For many years, the entertainment industry has attempted to add video from a movie to use in a video game. The concept was to produce games with Hollywood production values, but add interactivity through branching storylines and sprite overlays. A sprite is a graphics object made up of a pattern of pixels and defined by a computer programmer. The object can be manipulated and combined to produce animated games or graphic screen displays. Using such techniques, these "interactive movies" were once thought to be the future of the video game industry. Personal computer and console game-makers quickly found that film production quickly consumed the financial resources.

Attempts have been made in the video game industry to insert video into a video game, rather than relying on animation or computer graphics. The video game retains a number of video clips in storage. Depending upon the actions of the user, the video game plays the corresponding video clip. There are at least two distinct disadvantages to such a system. First, the video does not play continuously throughout the game. Second, the video may not be imported easily from a movie. Instead, the clips must be refilmed and stored on the appropriate media. Numerous attempts have been made to overlay games on the video clips in both the personal computer and game console industry.

One conventional attempt for playing an interactive game over a video is "Dragon's Lair." Dragon's Lair used branching video paths to create an arcade experience. However, this game was based around an analog LaserDisc, not digital video. Digital video is superior to analog in quality. Also, the technology used for branching analog video paths does not translate into digital technology.

The first game to use digital video was "Sherlock Holmes: Consulting Detective." The budget was extremely high and was filmed by experienced filmmakers with professional actors on real sets. Both the high cost and the requirement to film separate scenes make this technology undesirable for interactive movies.

The first full motion video ("FMV") game was "Night Trap" by Digital Pictures and was produced on both Laser-Disc and CD platforms. FMV is video system that can display continuous motion. Some slow-speed CD-ROM drives and low-bandwidth networks are unable to handle the mass of data required for full-motion video, so video playback tends to jerk unevenly. Also, video is often grainy and slightly blurred. Night Trap was also one of the first interactive games composed of footage of real actors. Digital Pictures would later release "Sewer Shark" for the SegaCD platform. Properties such as resolution and color palette were lacking in video. Overall, FMV did not provide the solution to interactive movies.

Other games rely heavily on a mixture of computer graphics and additional footage of actors. "Star Wars: Rebel Assault" and "Rebel Assault II" by LucasArts Entertainment Company utilized video recorded on a stage using professional actors. To add authenticity, original props and costumes were borrowed from the actual film production for the video game shoot. No ships, buildings, or other sets were built for use with the actors. Instead, actors were videotaped on a blue-screen stage, a large room whose walls are all painted in a special shade of blue. After the footage is recorded and digitized, a special-effects technician can use a computer to replace all the blue portions of the imagery with computer-generated imagery of an appropriate location. The budget for this product was very high and required significant time to provide the necessary computer graphics.

In another conventional attempt at an interactive movie, Trilobyte's "The 7th Guest" played video clips as a reward for solving puzzles. The video was poor quality, as actors were filmed on a blue screen stage. Without a clean key, the resulting film had the appearance of blue halos around the actors. Additionally, game play was not related to the sequence of the video.

Other conventional attempts require the game to load a video clip associated with an action of the user. In "The Psychic Detective" by Electronic Arts, an adventure game used video branches and sprite overlays to provide user interaction. When the game prompts the user with options such as "Run Away" or "Knock on the Door," the perspective view changes based on the user's selection. Through these selections, the game can lead the user to one of many different endings.

The Psychic Detective does provide for constant movement throughout the game. Even through a wrong choice, the video continues. However, the game is not playing a continuous video, but rather playing video clips sequentially based on the user's selections. In fact, The Psychic Detective requires a three CD set to provide all of the video clips and programming.

The Psychic Detective is far from the desired product of a mixture of motion picture and video games. These conventional attempts to provide an interactive movie do not fully incorporate the product of the filmmakers and game developers. Interactive movies require features that are not incorporated in conventional interactive media. The media does not allow a user to "participate" in a movie. The user can neither play the role of a character or assist in an action sequence. Conventional attempts have utilized both personal computers and video playback devices such as VCRs. However, a personal computer is not an ideal video playback device and video playback devices do not have the computing power of a personal computer.

Creating original video content for a video game is a costly process that often does not have the production qualities of a Hollywood movie. Because utilizing custom video content is so expensive considering the revenue generated, conventional attempts are not successful in creating a true interactive movie. What is desired is a move that can be altered to allow the user to interact with the high quality footage of the film studio.

SUMMARY

A system and method of interactive video playback is disclosed which provides interactive game experiences on consumer playback devices, such as a DVD or High-Definition video players. Pre-existing media is used to provide an interactive game experiences to a user. A media playback device dynamically edits or compresses pre-existing media from its original form to a form more conducive to interactivity, such as game playing. Graphics, text, or other video is superimposed on the media to create an interactive experience.

The interactive media player may for example be a DVD player, a personal computer, a high definition or software video player. In one embodiment, the pre-existing media is a video such as a television show or a movie.

For example, a DVD containing a movie may be used as the pre-existing data for which an interactive game is created. Generally, movies contain many scenes edited together, some of which may be close-ups. However, in an interactive game, scenes such as close-ups are not desired. Therefore, the video is edited to remove portions not desired such as slower scenes and close-ups, leaving only the action sequence as the remaining video.

In one embodiment, the video is edited on the fly by utilizing a table or list of times or triggers which define when to stop, start, or how long to cut the video. The media player processor is utilized to dynamically edit the video stream, with sufficient memory to buffer the segments to allow a smooth transition between segments. The system also allows for an overlay of graphics or text for game play or interactivity. Additionally, the system is capable of video and audio mixing.

Another embodiment provides a method of providing an interactive game through playback of video, the method comprising the steps of providing a video player with a processor, the processor accepting user input, drawing graphics or text on top of video playback, and controlling playback of sounds; providing media with a video stream for standard playback and a plurality of segment identifiers to indicate to the processor which segments of the video stream are to be played during game play; and superimposing graphics or text onto the video to create an interactive game experience. A segment of the video stream is skipped that interrupts continuous play of a game. A segment of the video stream is played based on user interaction. The segment identifiers may be triggers. The segment identifiers may be provided in an edit decision list. Input by a user is provided with a remote device. The remote device comprises a keyboard, mouse, remote control, or gaming controller. Associated audio is provided with the graphics or text. Additional graphics or text are displayed in response to user input.

Still another embodiment provides a system for interactive media, the system comprising a video player for playing media; a plurality of segment identifiers within the media, wherein the video player recognizes the segment identifiers and plays segments between select segment identifiers; and an overlay for the played segments, wherein the overlay assists a user to interact with the played segments. A CPU for managing the playing of segments and overlay for played segments. The plurality of segment identifiers are in an edit decision list. The edit decision list is a branching edit decision list, wherein the played segments correspond to user input. The segment identifiers may be triggers. The overlay comprises graphics or text. The video player is a DVD player, high definition player, or personal computer. The media is a DVD, DVD-ROM, CD, CD-ROM, or media from a LAN storage, the internet, a server, or a hard drive. The overlay comprises audio.

Another embodiment provides a method for interacting with media, the method comprising the steps of providing the media to a media playback device; removing portions of the media to allow for substantially continuous viewing of a scene; and inserting graphics on the remaining portions of the media to assist the user in interacting with the remaining portions of the media. Portions of the media are marked to be removed. The remaining portions of the media are played based upon user interaction. A list of times to begin and end scene removal from the media is also provided.

The foregoing and other objects, features, and advantages will become apparent form a reading of the following detailed description of exemplary embodiments thereof, which illustrate the features and advantages of the invention in conjunction with references to the accompanying figures.

DRAWINGS

The accompanying drawings, which are included to provide a further understanding and are incorporated in and constitute a part of this specification, illustrate embodiments of the invention and together with the description serve to explain the principles.

FIGS. 1*a*-1*b* are flow diagrams according to an embodiment.

DETAILED DESCRIPTION

Figure 1A:
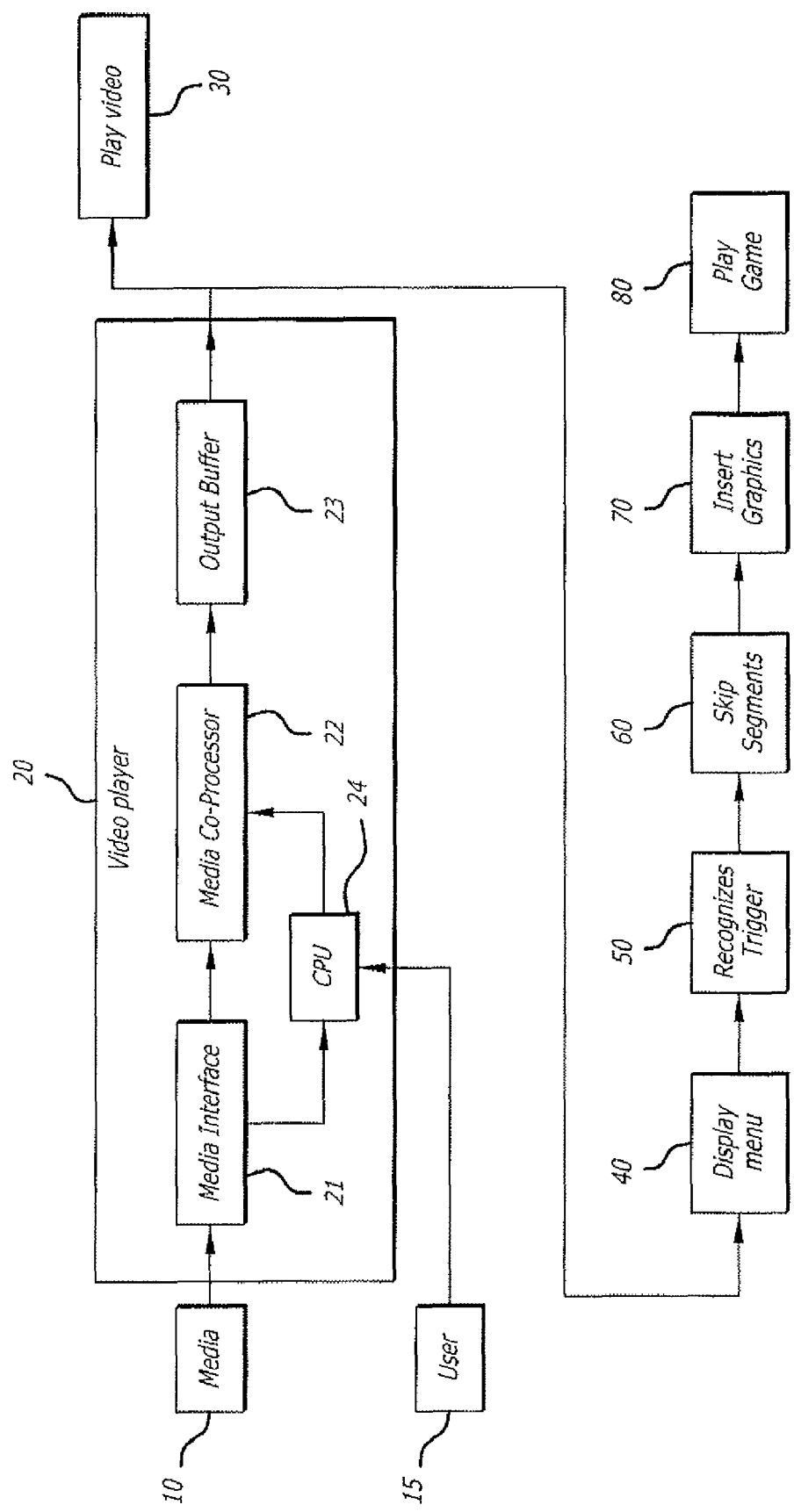

The system and method of interactive video playback adds interactive movie functionality to video players. Referring to FIG. 1, the process of providing an interactive movie is shown. Media 10 is fed into a video player 20 that may play video 30 on media 10 in a conventional application. Video players include, but are not limited to, DVD players, high definition video players, and software DVD-ROM. Media includes, but is not limited to, DVDs and other high capacity storage devices. In an example of the conventional use for the video player, a DVD player can play a movie recorded on a DVD.

Video player 20 provides at least a few functions that differ from conventional video players. First, video player 20 provides an on-screen menu for the user. Second, video player 20 recognizes capabilities in the DVD. Third, video player 20 inserts an overlay. Fourth, video player 20 skips undesirable scenes.

A method and a system allow a user to play a game or other interactive experience utilizing the provided media. Upon a depression of a button on a remote control, joystick, or keyboard, a click on a mouse, or other activation, optionally through a remote device, a user 15 commands a CPU or processor 24 of video player 20 to display a menu 40. CPU 24 then commands a media co-processor 22 which sends the graphics and text of menu 40 to output buffer 23 before being displayed on the screen to ensure smooth transitions and prevent frame drift. Menu 40 can be displayed to the user during the operation or playback of media 10. Alternatively, this menu may be presented before or during playback of the media. Upon such activation or through other means before or during playback, the system displays an on-screen menu 40. Through a similar action, the user can select the option for playing a game or other interactive program from menu 40. Alternatively, by depressing a button on a remote control, joystick, or keyboard, clicking on a mouse, or other activation through a remote device, the system may load a game or other interactive program without the use of a menu. In such an instance, a button on the remote device may be labeled "Start" or "Game."

The system has the capacity to reuse traditional, linear narrative media effectively for interactivity. Media 10 is streamed into a media interface 21 of video player 20. An executable file, optionally provided in media 10, is provided from media interface 21 to CPU 24. The video stream continues to media co-processor 22. In order to provide effective interactivity, CPU 24 recognizes triggers 50 within media 10.

The system provides an interactive video playback platform with arbitrary real-time edit decisions. Upon activation of the game or interactive program, CPU 24 searches media 10 for triggers or segment identifiers. The segment identifiers provide indications for the segments that should be played during use of the media as a game. The played segments of a movie may be played in sequential order, or in any varied order. The remaining segments are filtered out by skip segments 60 due to their interruptive nature of the game. For example, in an action sequence of a movie, some scenes comprise close-ups of a character's face. In playing a game based on this footage, the system optionally removes the close-up footage so that the action sequence can run continuously. Segment identifiers are situated at the beginning and end of the interruptive scenes. The segment identifiers may appear in one of at least two different ways. In one embodiment, triggers are embedded within the code of the media. In an alternative embodiment, the control program utilizes a listing corresponding to the timing of certain segments.

In one embodiment, triggers are embedded within the media. As media 10 streams into media interface 21, CPU 24 recognizes a starting trigger at the beginning of a segment. CPU 24 commands media co-processor to skip a segment between the starting trigger and a next trigger. Output buffer 23 does not receive that segment for display. As a result, output buffer must have sufficient capacity to transition segments smoothly and maintain a continuous video. Video player 20 plays the media after the next trigger until another starting trigger appears.

In an alternative embodiment for skipping segments, along with any data required to play the game, the CPU processes an "edit decision list" ("EDL") for interactivity. The interactive EDL can exist embedded on the media, encoded into the video stream itself, or loaded and/or streamed from a computer network. When in conventional movie-playing mode, this EDL is ignored, allowing the media to play in its original form. When the player is placed into interactive or game mode, the CPU causes the player to skip over portions of the media that detract from the interactive experience. During game play, the logic in the CPU examines the EDL and determines that on reaching a certain frame of video, the read-head should jump ahead by a few seconds to skip over the next few shots of non-interactive material. Also, the EDL can cause the video stream to jump backwards arbitrarily, allowing reuse of shots to increase the duration of the game.

In one embodiment, the video player utilizes the EDL to play segments of media depending upon the user's interaction with the game. The CPU uses the interaction of the user to advance to another segment or replay a segment if the user provides successful actions within the game. For example, as the user is playing a game, successful hits of a target prompts the CPU to skip to a more advanced level of game play. This requires the CPU to advance to another segment on the EDL. However, if the user does not successfully hit the targets, the CPU will replay certain segments listed on the EDL to provide a less challenging game for the user. Thus, the EDL may be either dynamic or fixed, allowing a game to vary based on user performance.

Figure 1B:
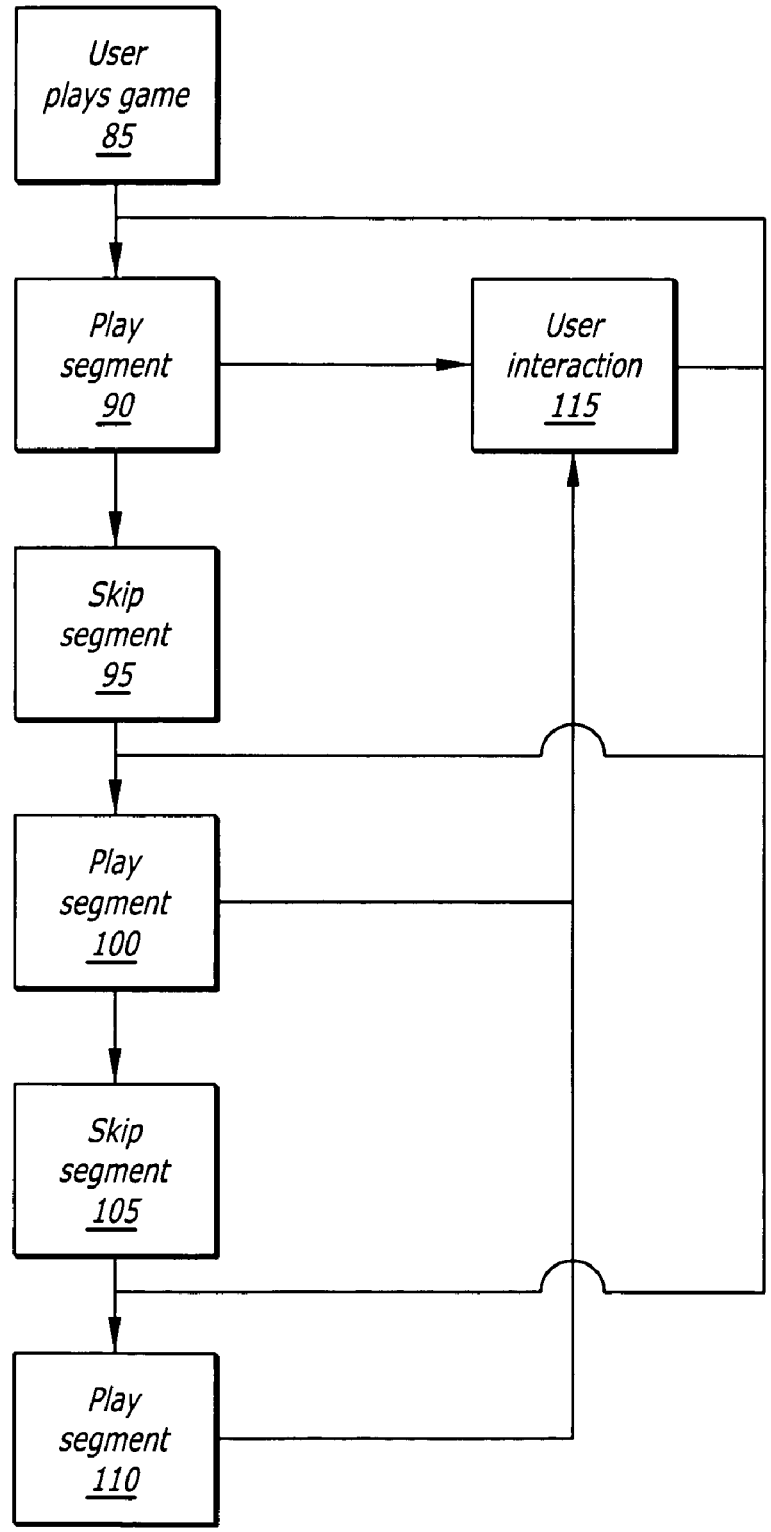

By branching the EDL, the logic in the CPU customizes the game based on how well player scores or other user interactivity. Referring to FIG. 1b, a user activates game play mode 85. The CPU reads the EDL and commands the media co-processor to play segment 90. Upon user interaction 115, the CPU may play segment 90 again or skip segment 95, as indicated by the EDL, and play segment 100 or segment 110. Upon further user interaction 115, the CPU may play segment 100 again or skip segment 105, as indicated by the EDL, and play segment 110. The CPU may also replay segment 90 or skip to segment 110 based on user interaction or playback as defined in the EDL. The EDL allows the CPU to jump from one segment to another based on user interaction or the sequential playback as seen in a movie.

To enable arbitrary jumps in the video stream, the video player reads video data into memory faster than the rate of the video playback. This buffering system allows video to continue playing uninterrupted even when the playback device is temporarily unable to read new video data, for instance an asynchronous read-head seek on a DVD player. The read-head is the tiny electromagnetic coil and metal pole used to read back the magnetic patterns on the disk. Seek is the movement of a read/write head to a specific data track.

For instance, the concept of taking a spaceship battle form a science fiction film and making it interactive may seem straight forward. The player guides a cursor around the screen, earning points for shooting the bad guys and losing points for shooting the good guys. Shooting a ship triggers an explosion animation and a sound, respectively placed over the video and soundtrack. In practice, the interactive designer would find that a large portion of the scene would be made up of cut-aways, close-ups, reaction shots, and other clips that do nor support the interactive design.

Media co-processor 22 provides video segments as well as graphics and text by insert graphics 70 into the video stream during game play. Such graphics and text may include, but are not limited to, the score of the game, a cursor for the remote device, or other graphics desirably overlaid on the video. The graphics and text provide a guide for playing the game as well as a means for the user to command the CPU to provide additional graphics or text. CPU 24 commands media co-processor 22 to include graphics and text in a certain configuration such that the user can play a game 80. Throughout the game, dependent upon user interaction, the chosen segments to be played, and data from the executable file, media co-processor 22 provides a graphic overlay for the segments to output buffer 23 for playback. Through the remote device, user 15 can play a game 80 on original movie content using the overlaid graphics text, while simultaneously skipping the segments that interrupt the continuous linear media.

Figure 2:
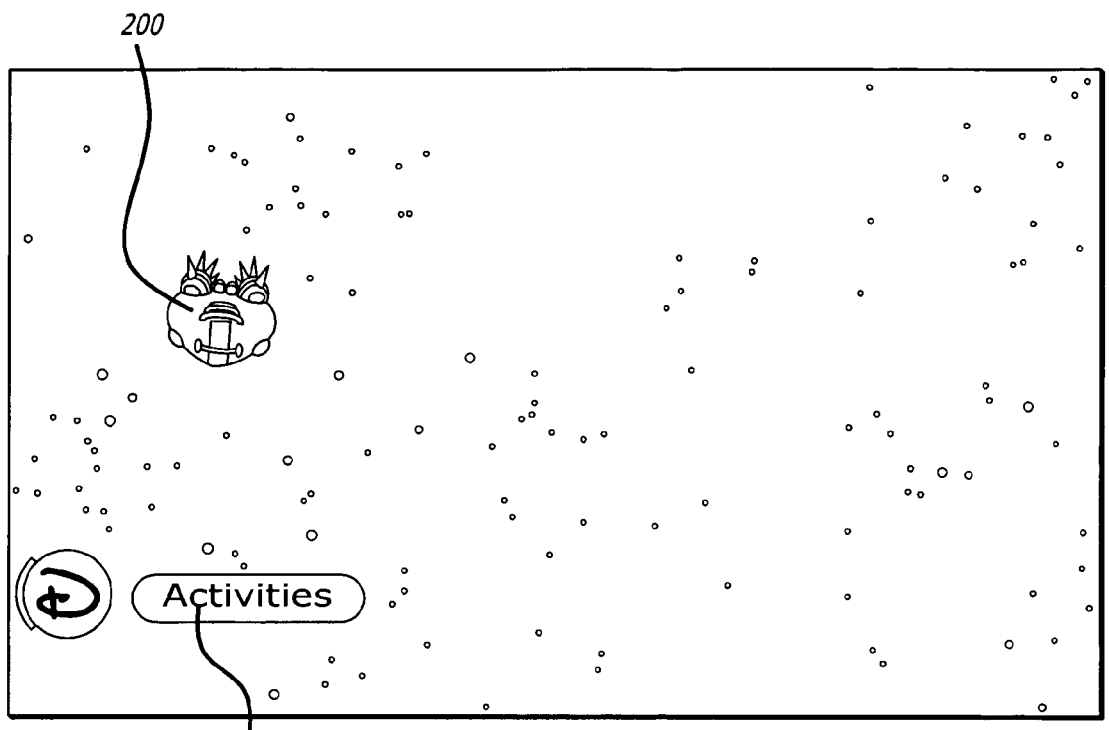
FIG. 2 is an exemplary screenshot according to an embodiment.

In an exemplary embodiment, a video stream has a spaceship 200, as shown in FIG. 2. By depressing a button on a game controller, a menu is activated and the option 210 for "Activities" appears on the screen.

Figure 3:
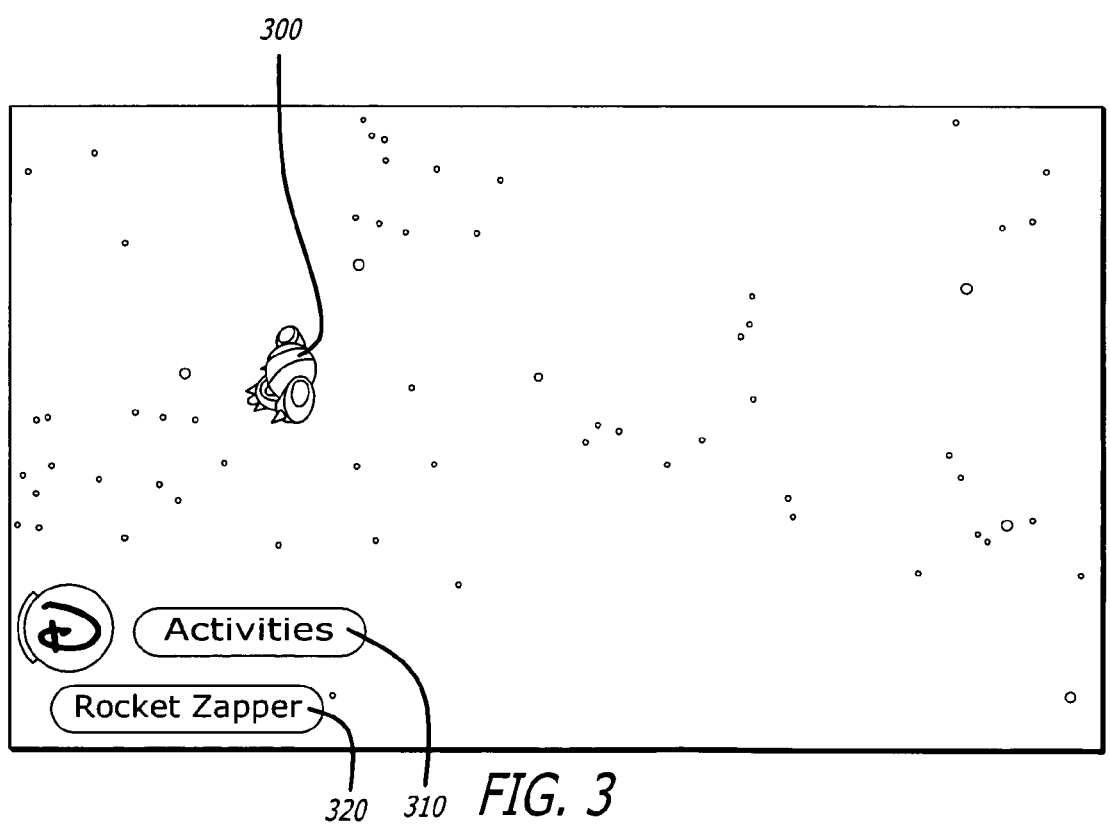
FIG. 3 is an exemplary screenshot according to an embodiment.

Referring to FIG. 3, upon the selection of "Activities" by the user, an option 320 for "Rocket Zapper" appears on the screen in addition to option 310 for "Activities." Previously chosen menu options may optionally appear on the screen. Also, use of menu items does not stop or pause the video stream, although menu items may be selected before playback of the media. In FIG. 3, spaceship 300 is still flying on the screen.

Figure 4:
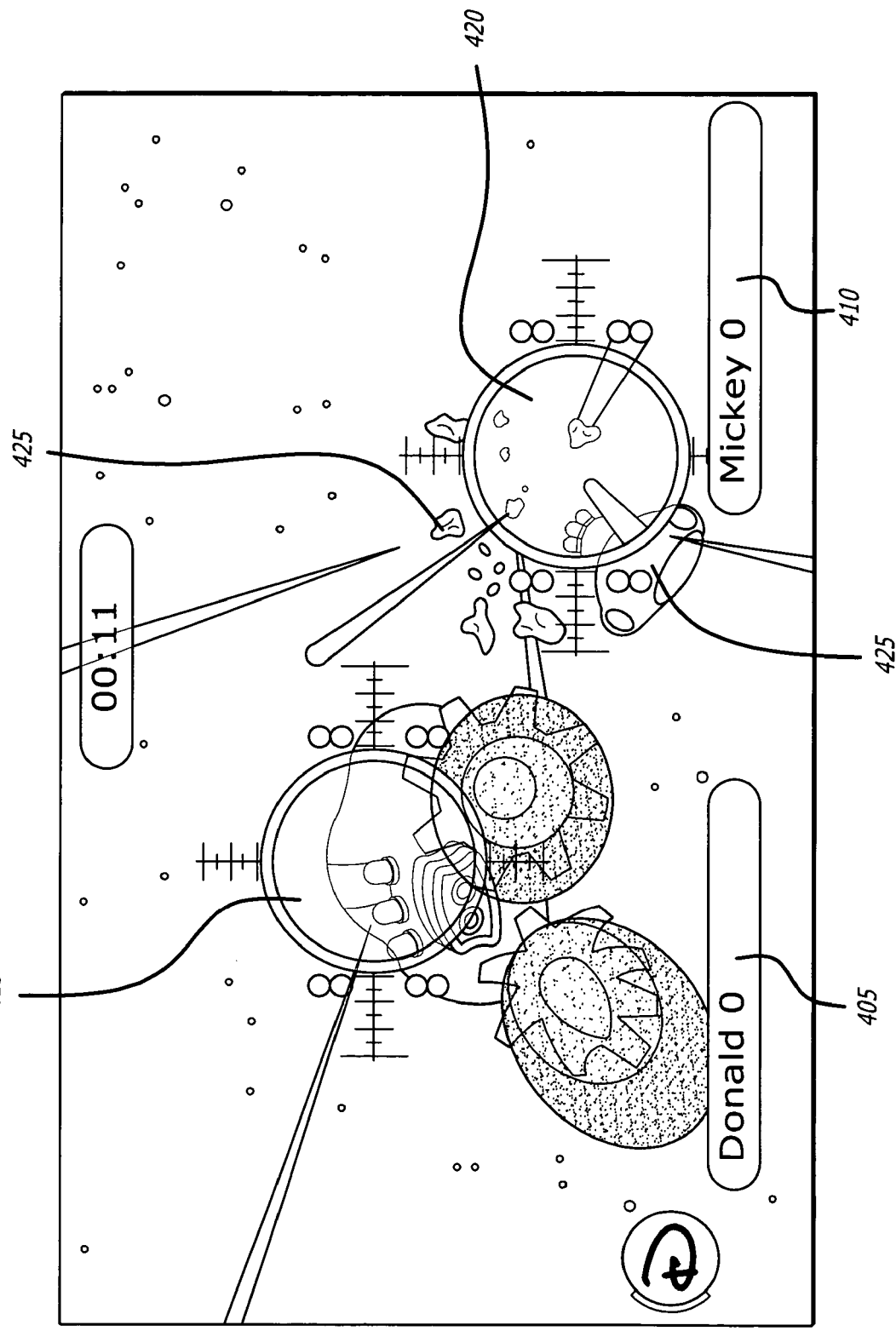
FIG. 4 is an exemplary screenshot according to an embodiment.

Upon choosing "Rocket Zapper," the video player switches to gameplay mode. The control program and processor recognize an EDL and draws graphics and text on the screen for playing the game. Referring to FIG. 4, a two player game is shown. Names of players "Donald" and "Mickey" appear in text boxes 405, 410. In this exemplary embodiment, targets 415, 420 are used for the two players in order to aim and shoot other spaceships 425. Shooting through targets 415, 420 may be controlled by a remote device. In the conventional playing mode, spaceships 425 would fly on the screen in an identical fashion.

Figure 5:
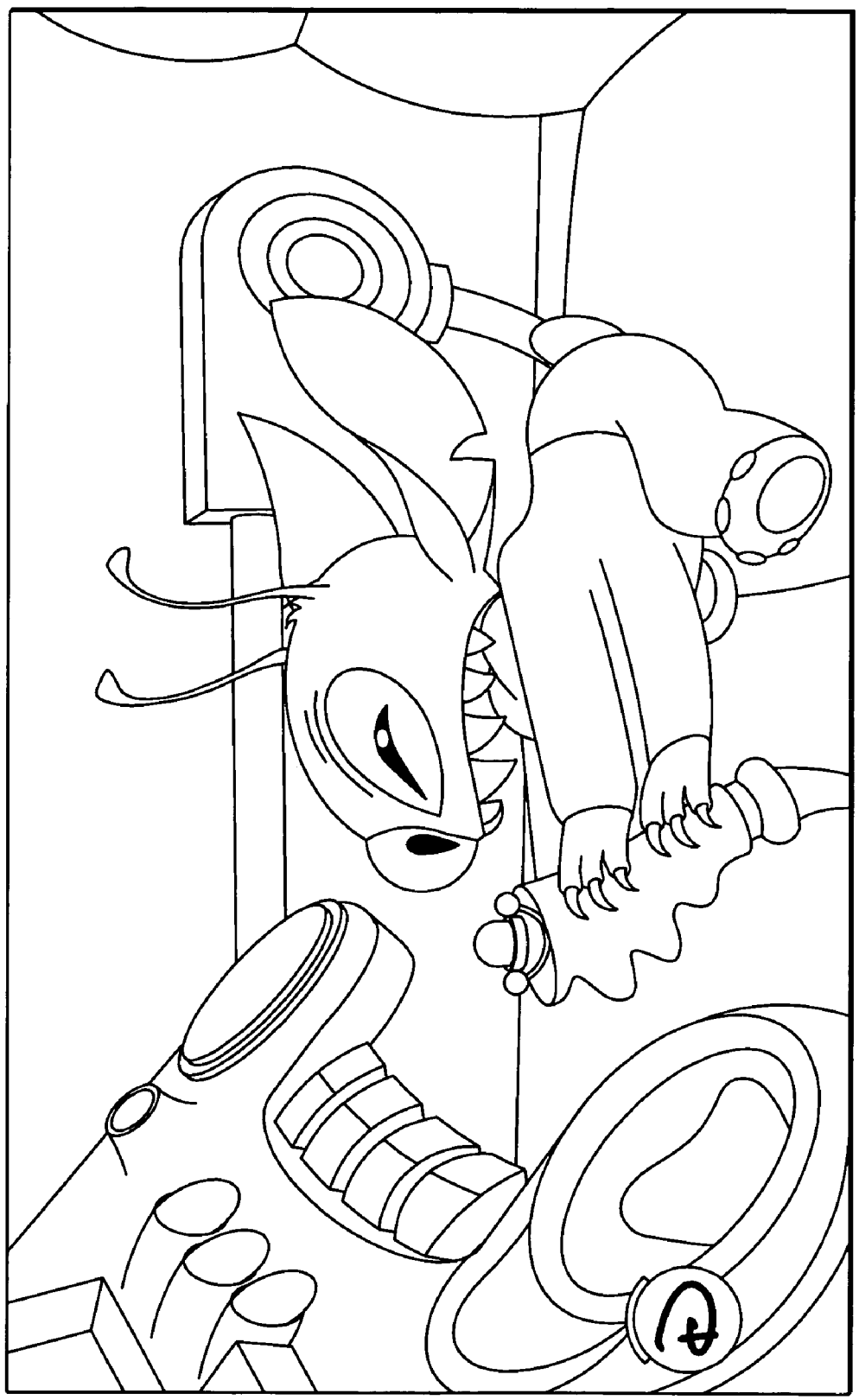
FIG. 5 is an exemplary screenshot according to an embodiment.

In this embodiment, close-ups and cutaways that appear in the original video stream are filtered from the footage. Responsive to the times on the EDL, the processor filters images and scenes, such as the one shown in FIG. 5. Showing this cutaway would disrupt the continuous play of the game. Accordingly, it is removed and the read-head seeks the next position on the DVD to continue playing the game.

Figure 6:
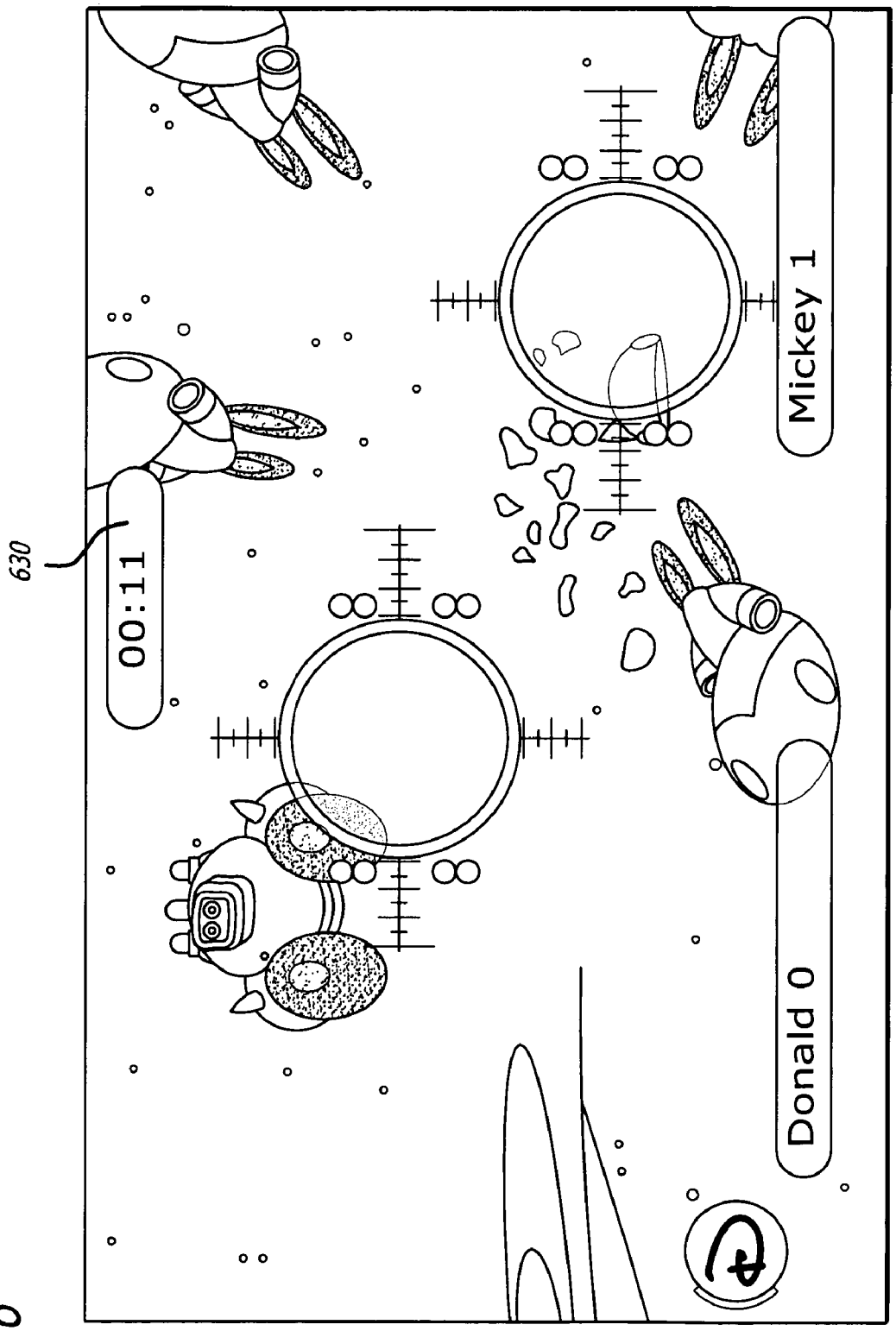
FIG. 6 is an exemplary screenshot according to an embodiment.

The game play continues with the user unaware of the presence of removed scenes. As shown in FIG. 6, counter 630 displays the same countdown, 11 seconds, as shown in FIG. 4, due to the fact that only a split second has elapsed, rather than a few seconds required to play the cutaway of FIG. 5. The two players can continue playing the game.

Figure 7:
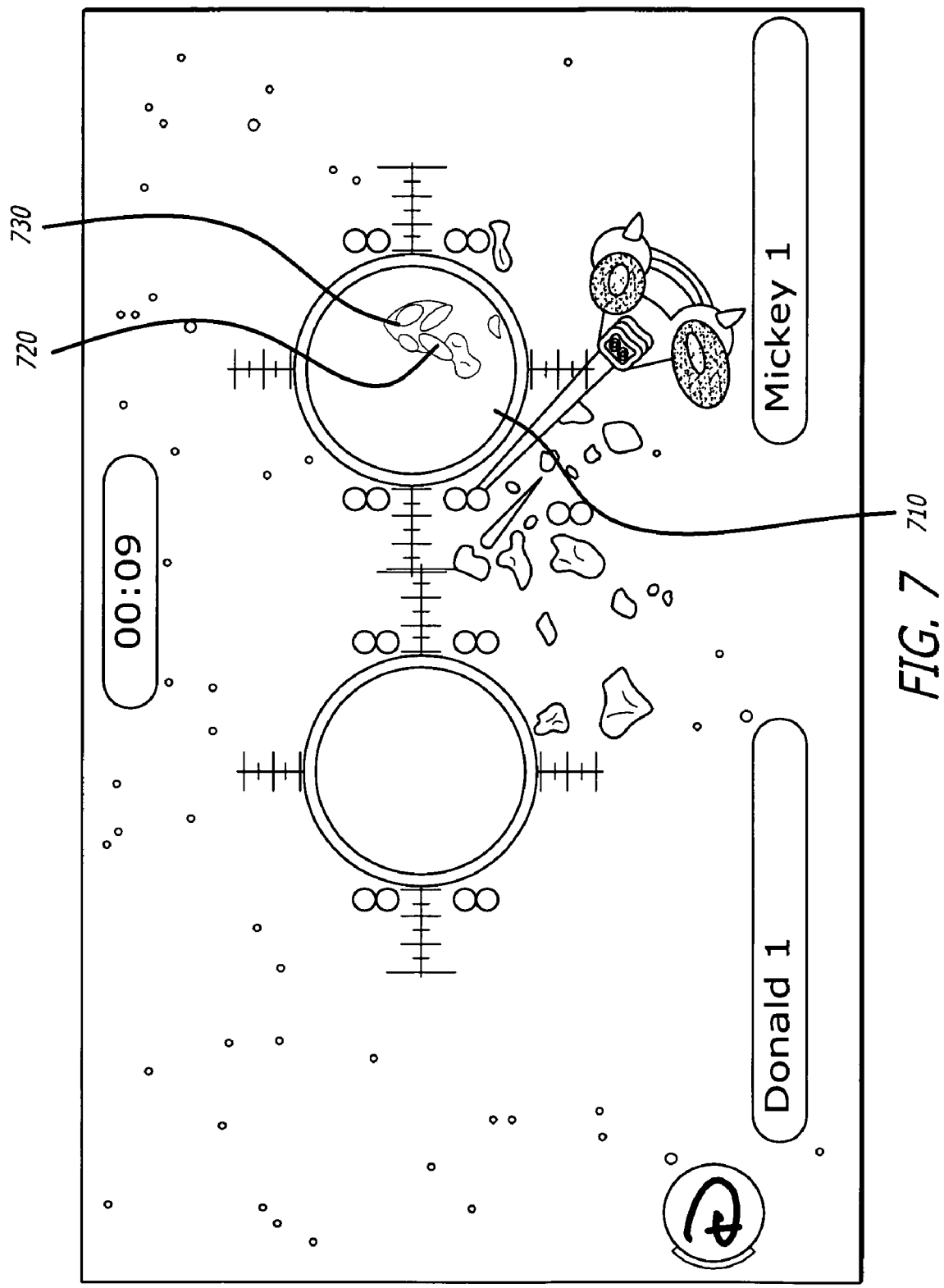
FIG. 7 is an exemplary screenshot according to an embodiment.

Referring to FIG. 7, the player "Mickey" shoots lasers 720 through target 710 at spaceship 730. Spaceship 730 is part of the original video stream.

Figure 8:
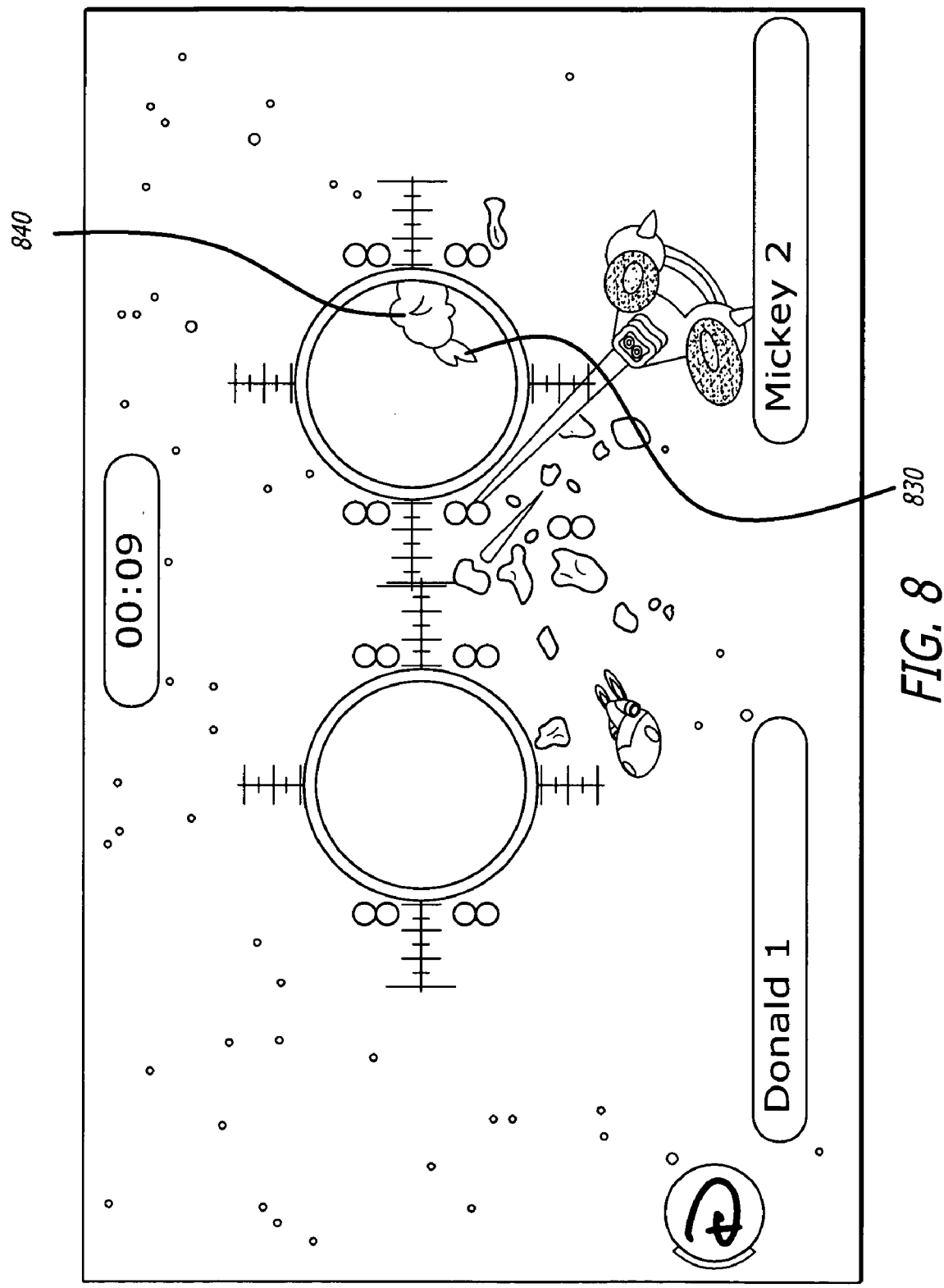
FIG. 8 is an exemplary screenshot according to an embodiment.
Figure 9:
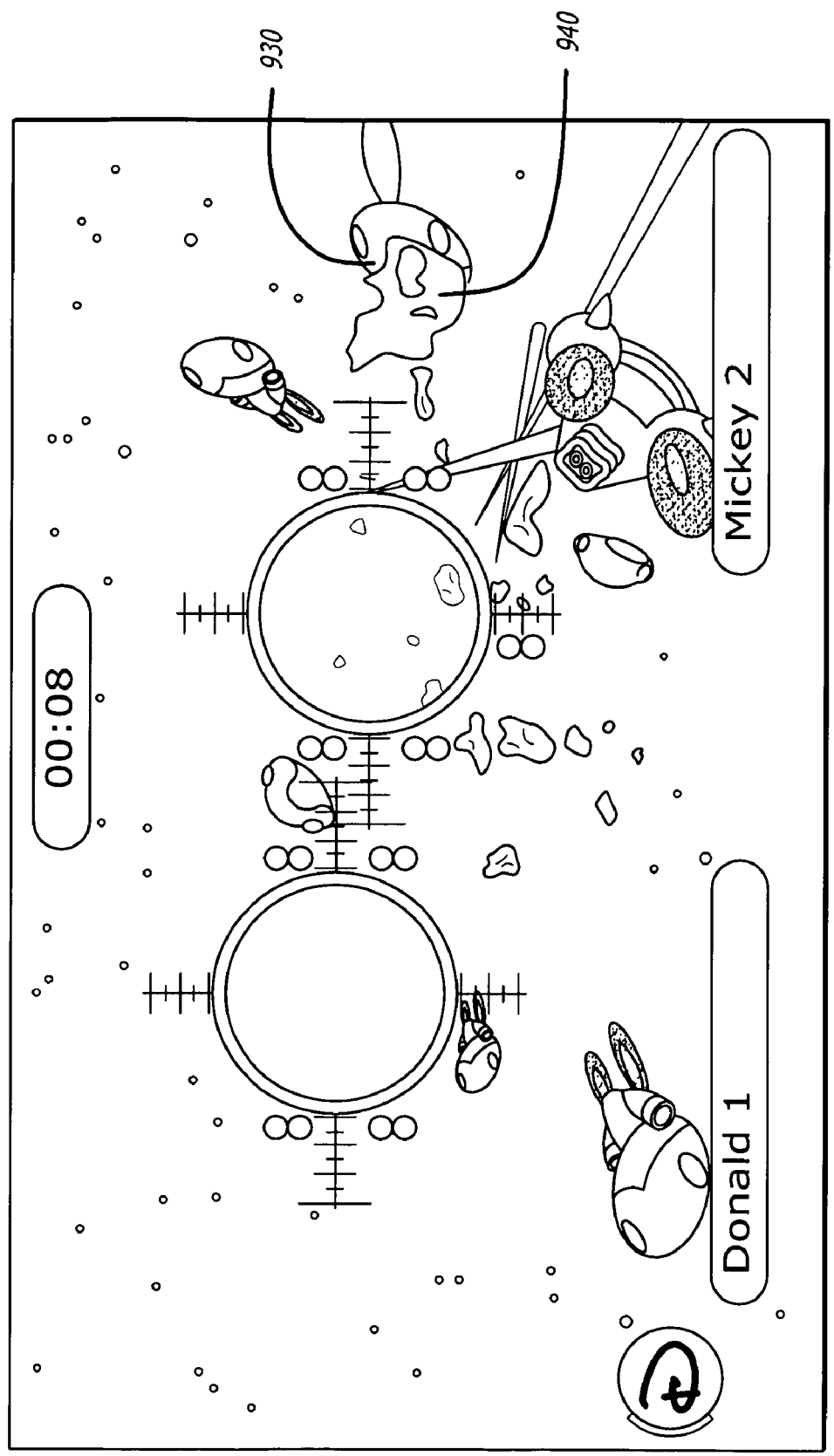
FIG. 9 is an exemplary screenshot according to an embodiment.

Referring to FIG. 8, an explosion 840 on spaceship 830 is shown after a direct hit from the lasers. Spaceship 830 is still original video content from the movie on the media. However, explosion 840 is drawn by the system and overlaid on the screen corresponding to spaceship 830 to appear as though it is exploding. Referring to FIG. 9, explosion 940 continues to overlay spaceship 930 as spaceship 930 appears to fly across the screen.

Figure 10:
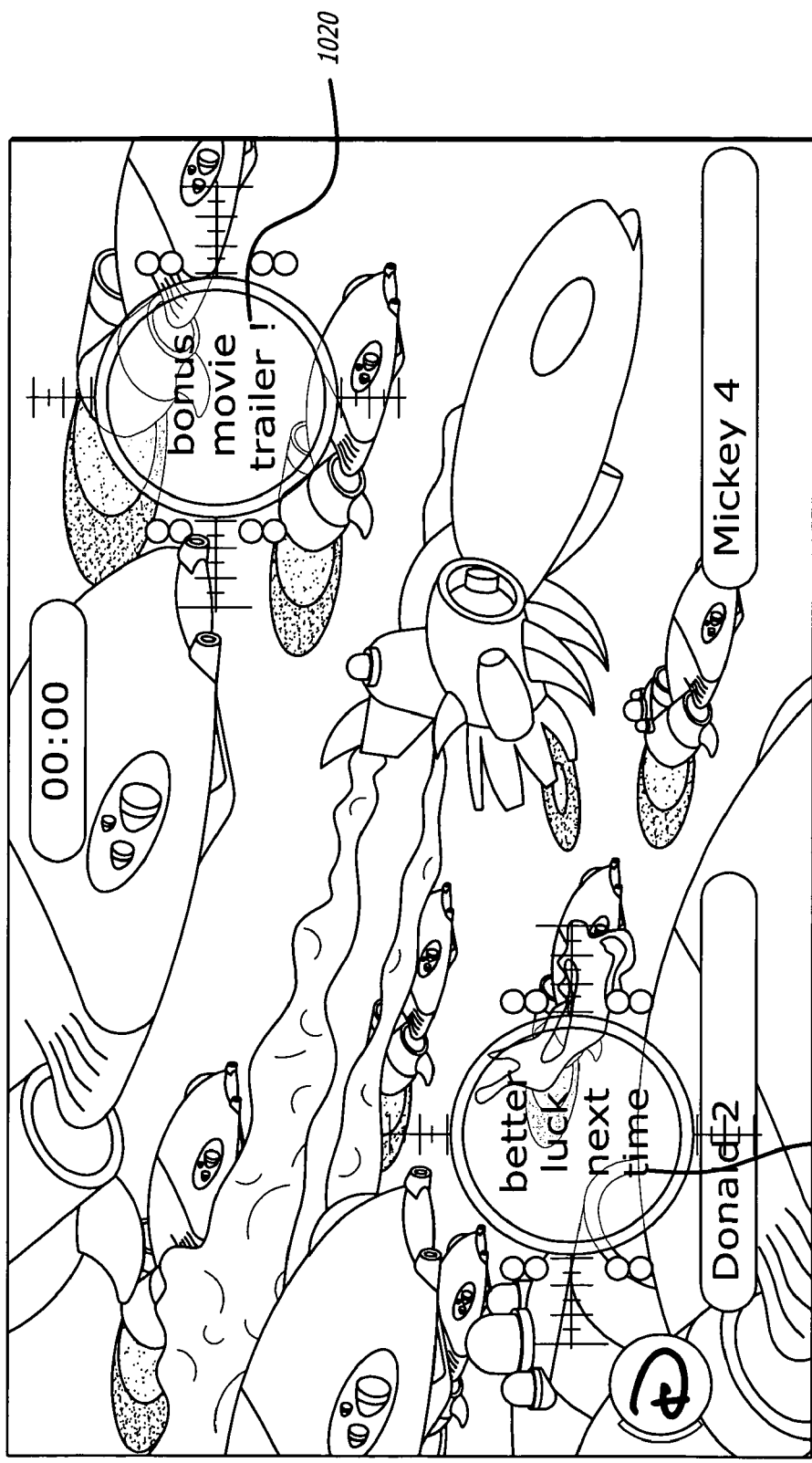
FIG. 10 is an exemplary screenshot according to an embodiment.
Figure 11:
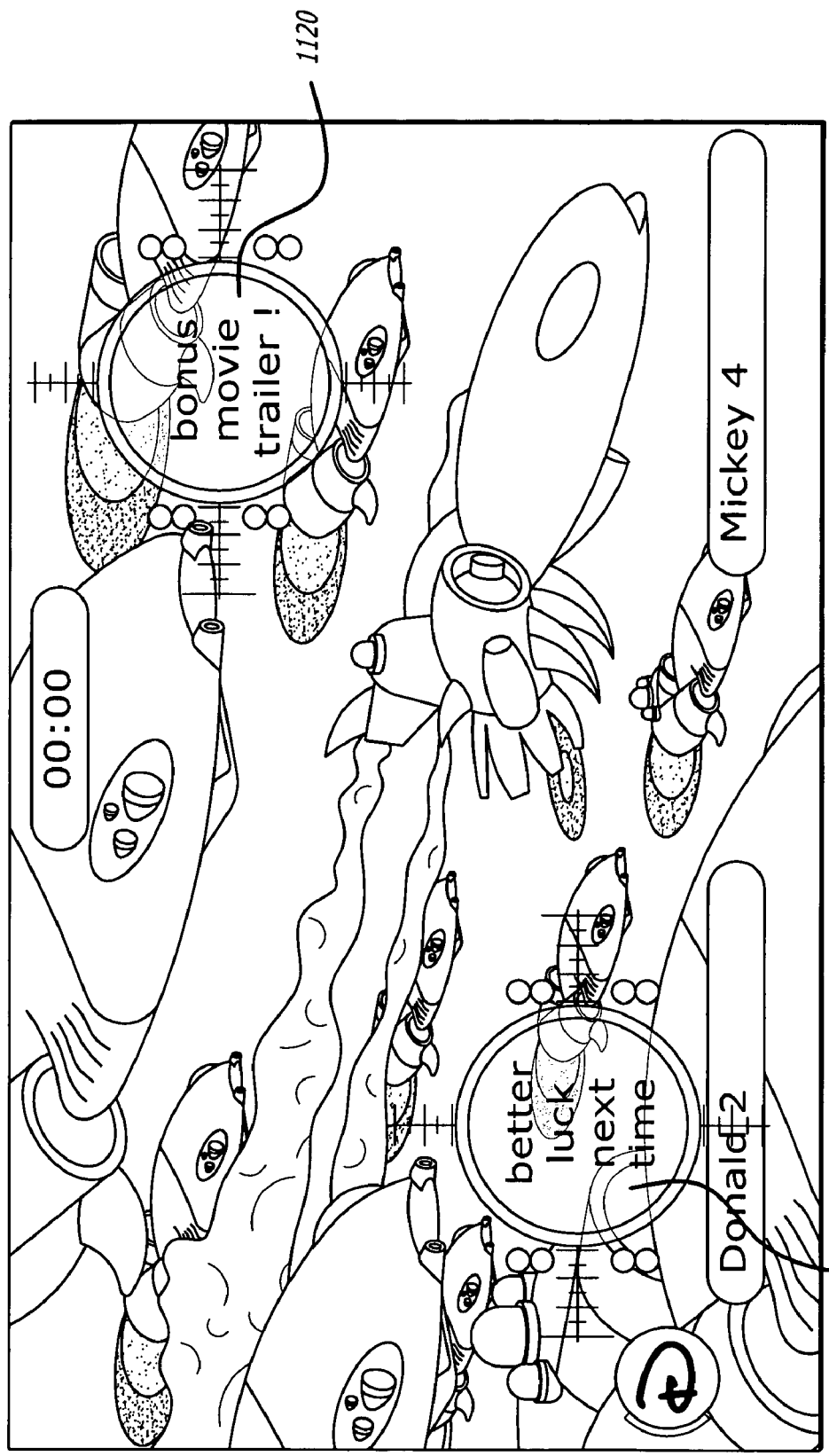
FIG. 11 is an exemplary screenshot according to an embodiment.

Referring to FIG. 10, a target 1010, 1020 appears for each user to play a bonus movie trailer. If the user successfully hits the target, a movie trailer from the media, or alternative source, will be streamed from the media onto the display. Referring to FIG. 11, one player has successful hit the target 1120. The other player has missed the target 1110, thus prompting "better luck next time."

Figure 12:
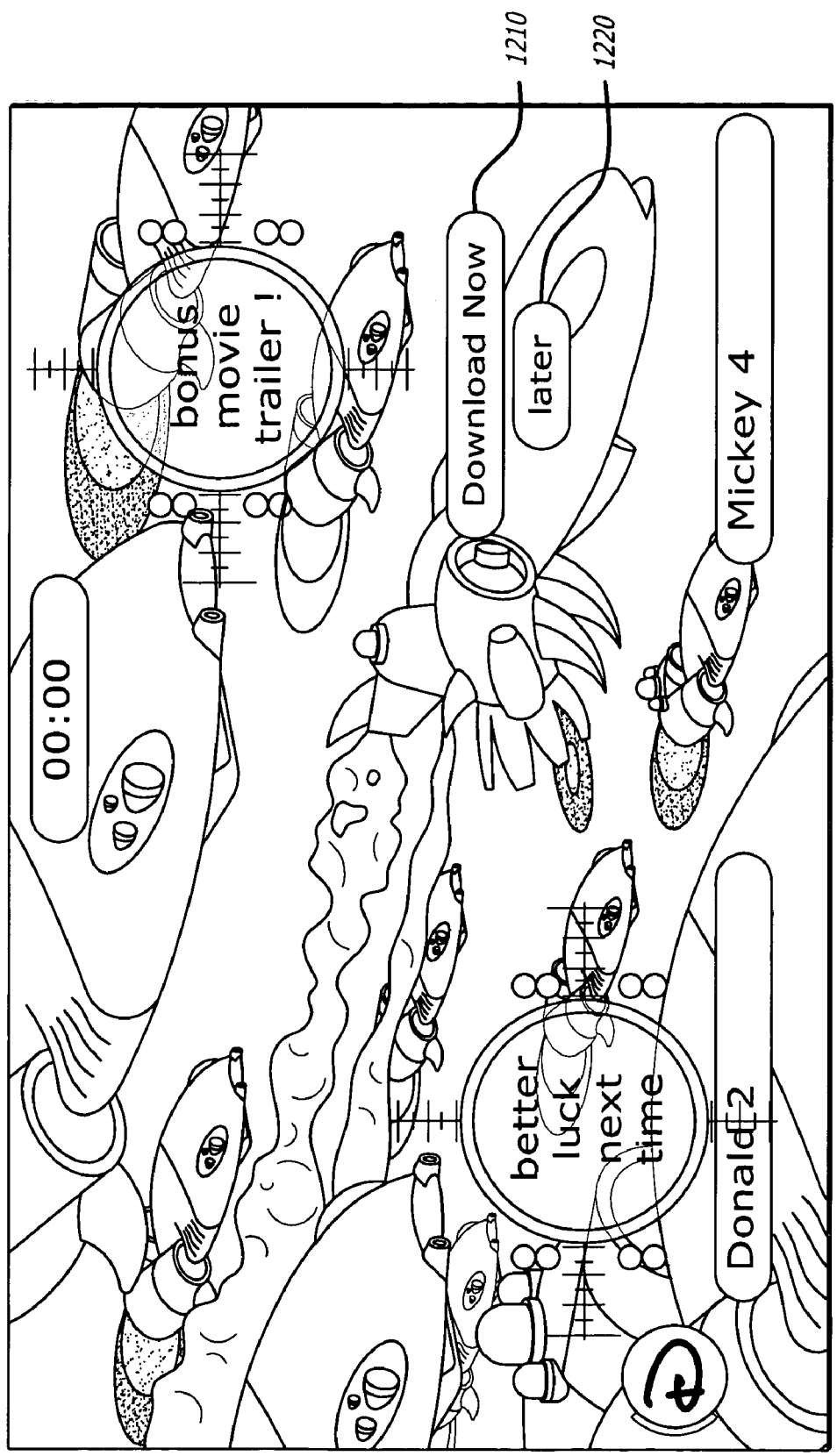
FIG. 12 is an exemplary screenshot according to an embodiment.
Figure 13:
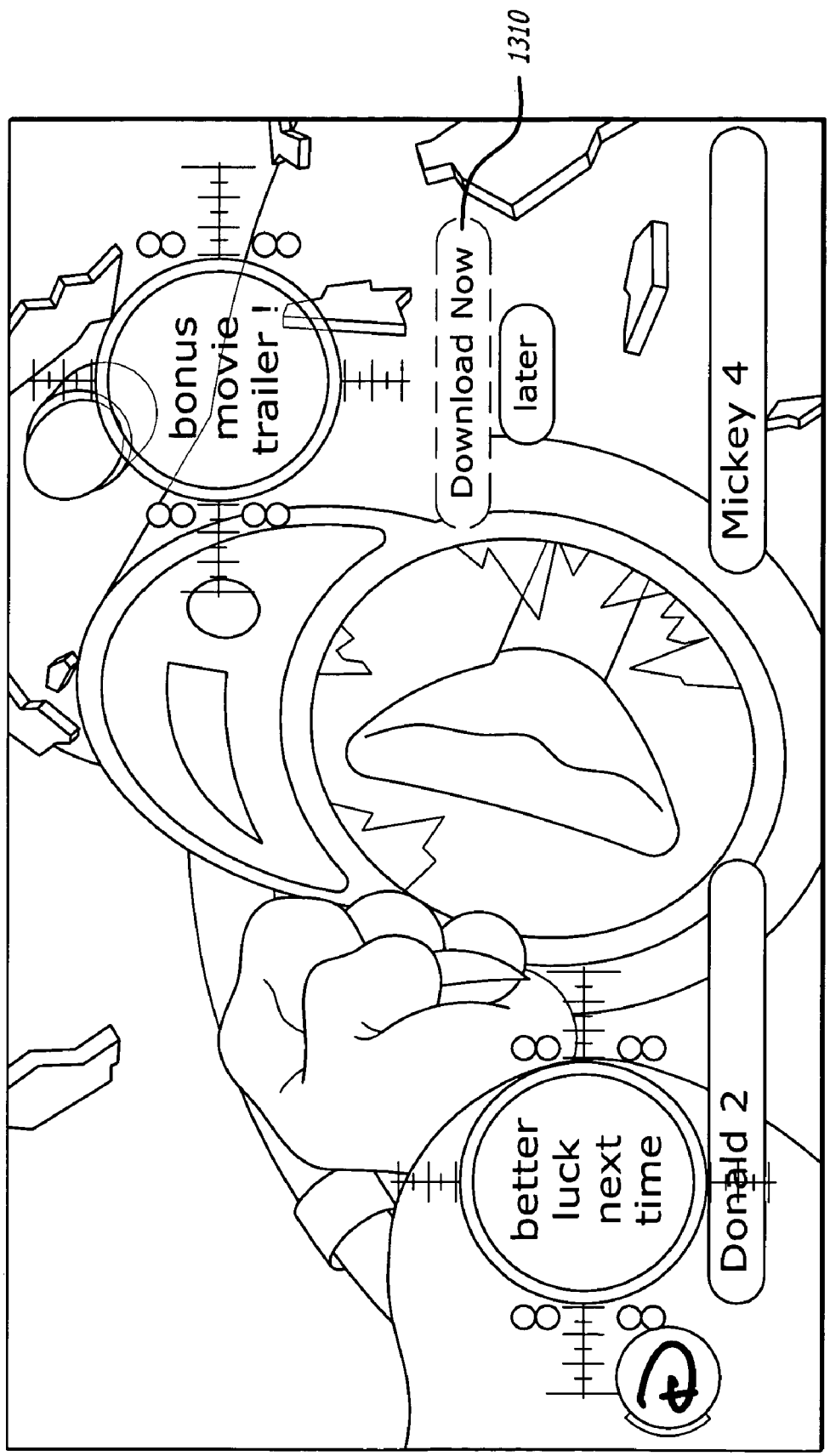
FIG. 13 is an exemplary screenshot according to an embodiment.

Referring to FIG. 12, the user who successfully hit the target has the options of "Download Now" 1210 or "Later" 1220. These options appear as buttons similar to the menu functions discussed above. Referring to FIG. 13, "Download Now" 1310 has been selected and a graphic overlay appears to make button 1310 glow.

Figure 14:
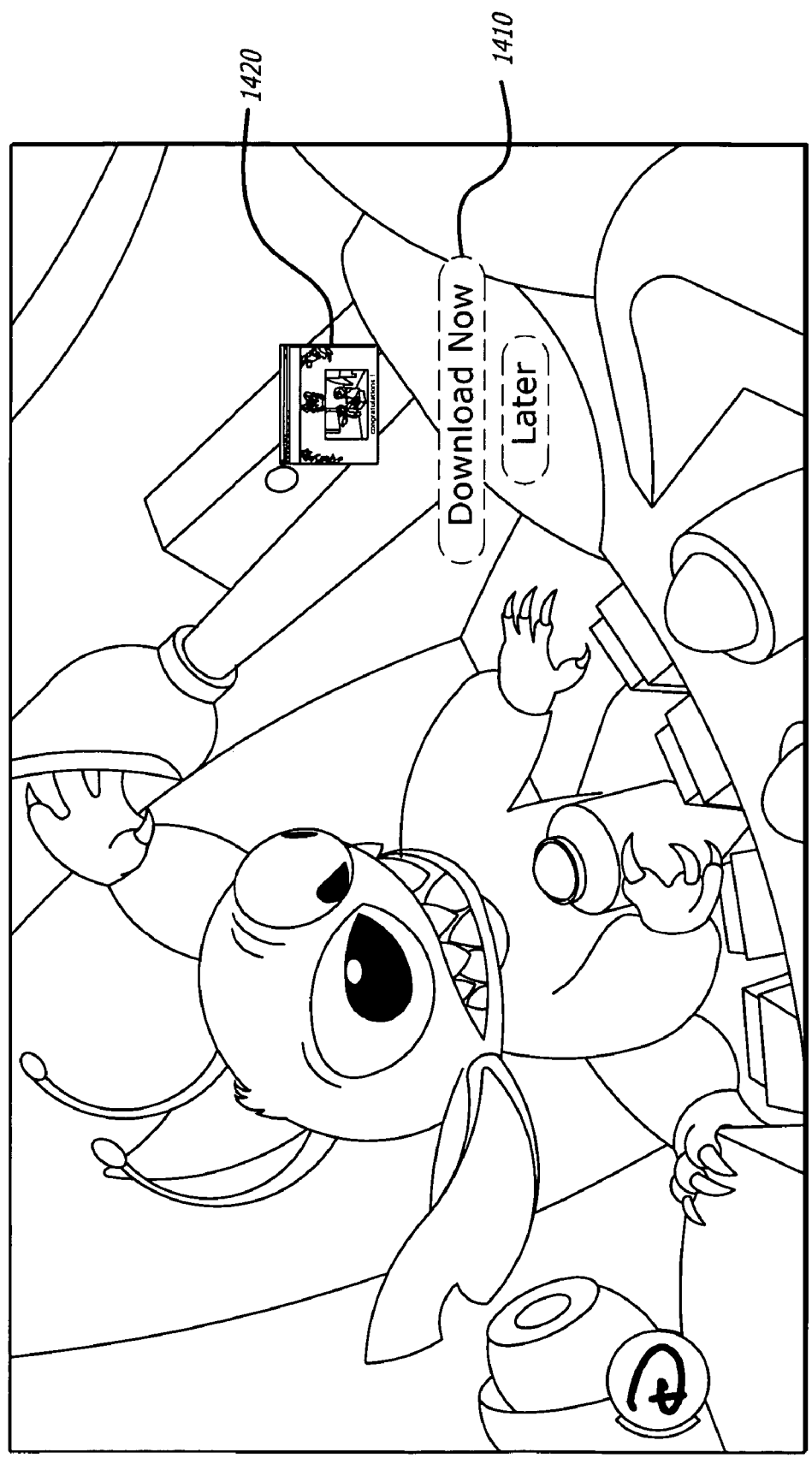
FIG. 14 is an exemplary screenshot according to an embodiment.
Figure 15:
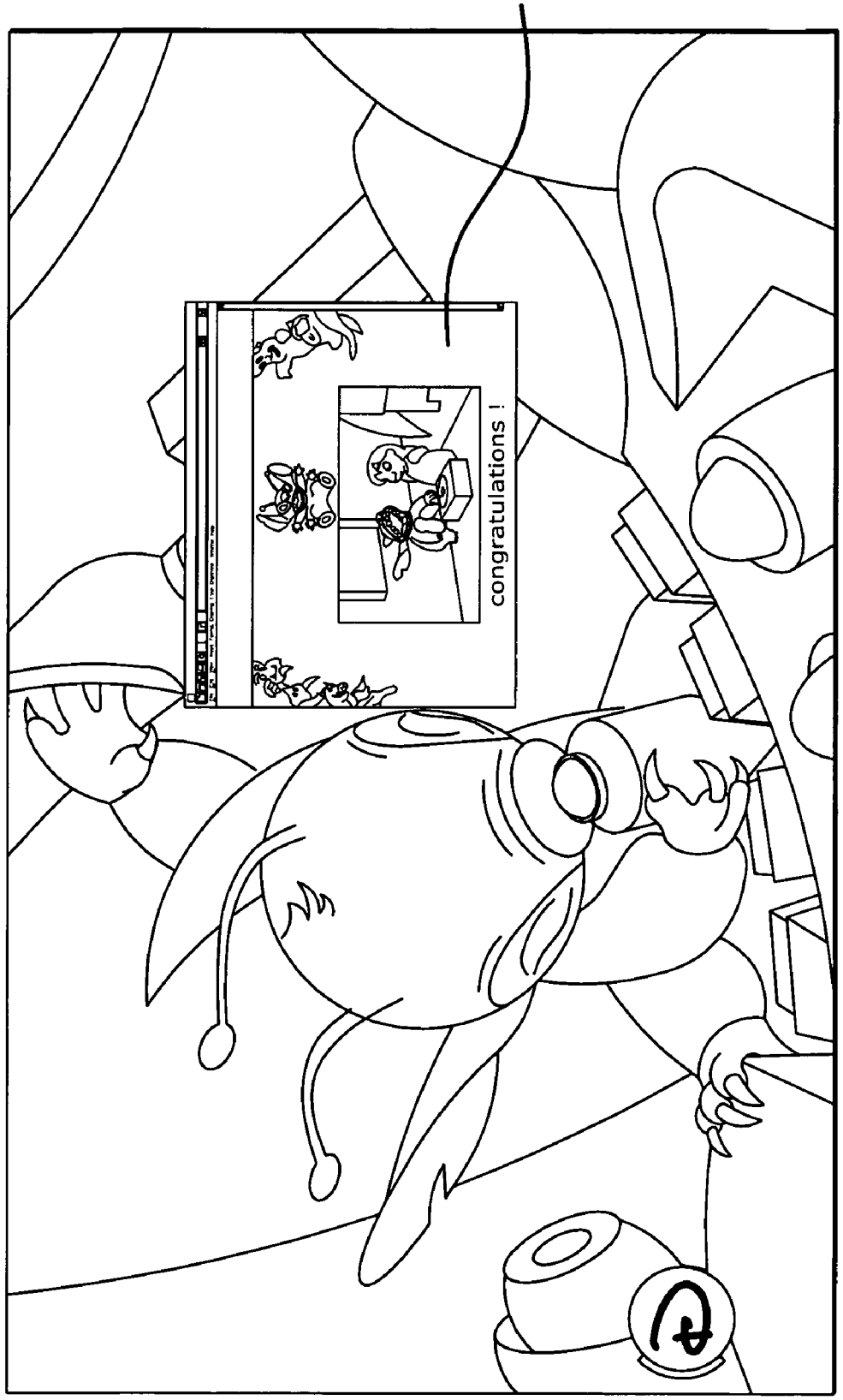
FIG. 15 is an exemplary screenshot according to an embodiment.
Figure 16:
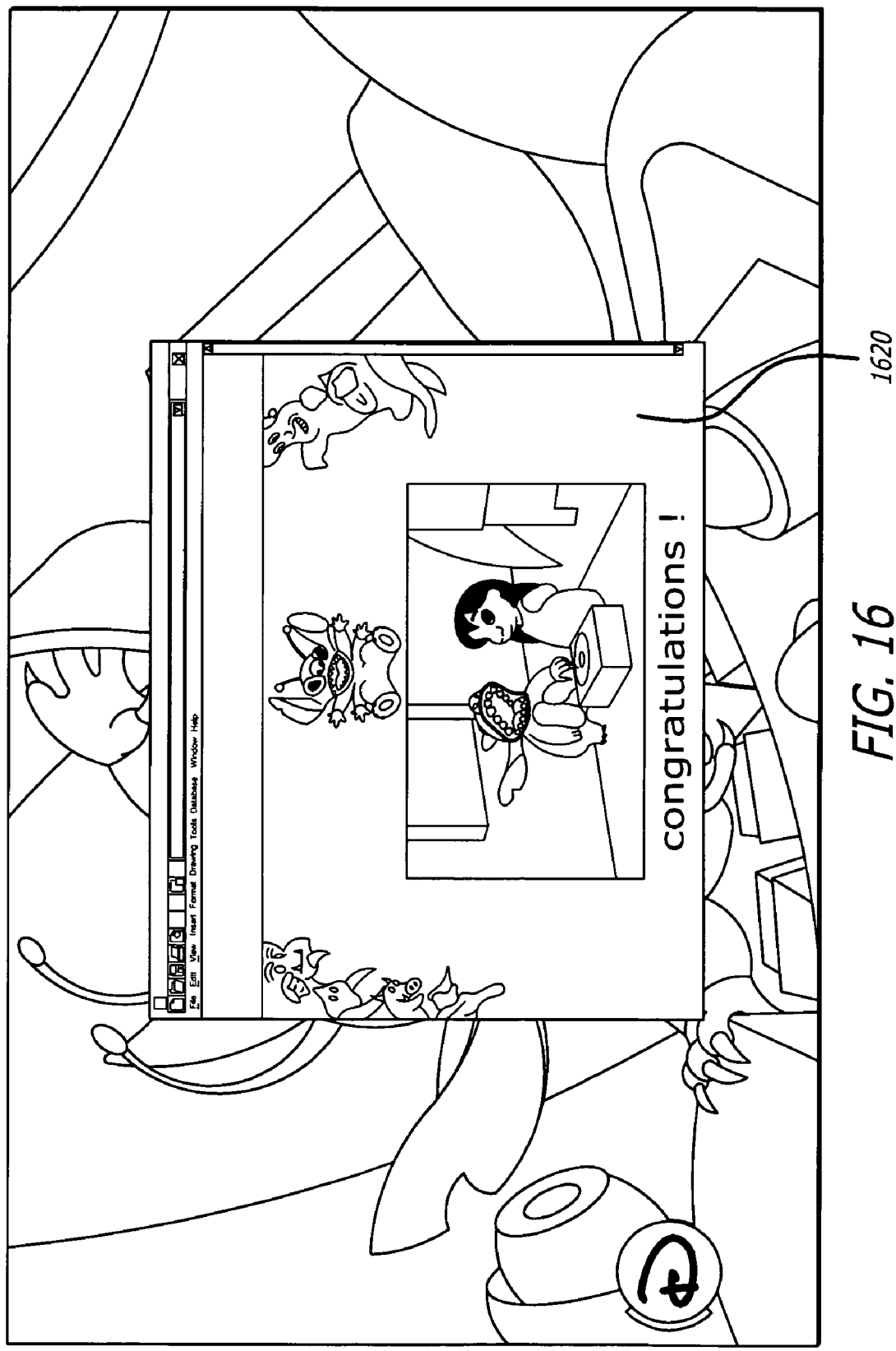
FIG. 16 is an exemplary screenshot according to an embodiment.
Figure 17:
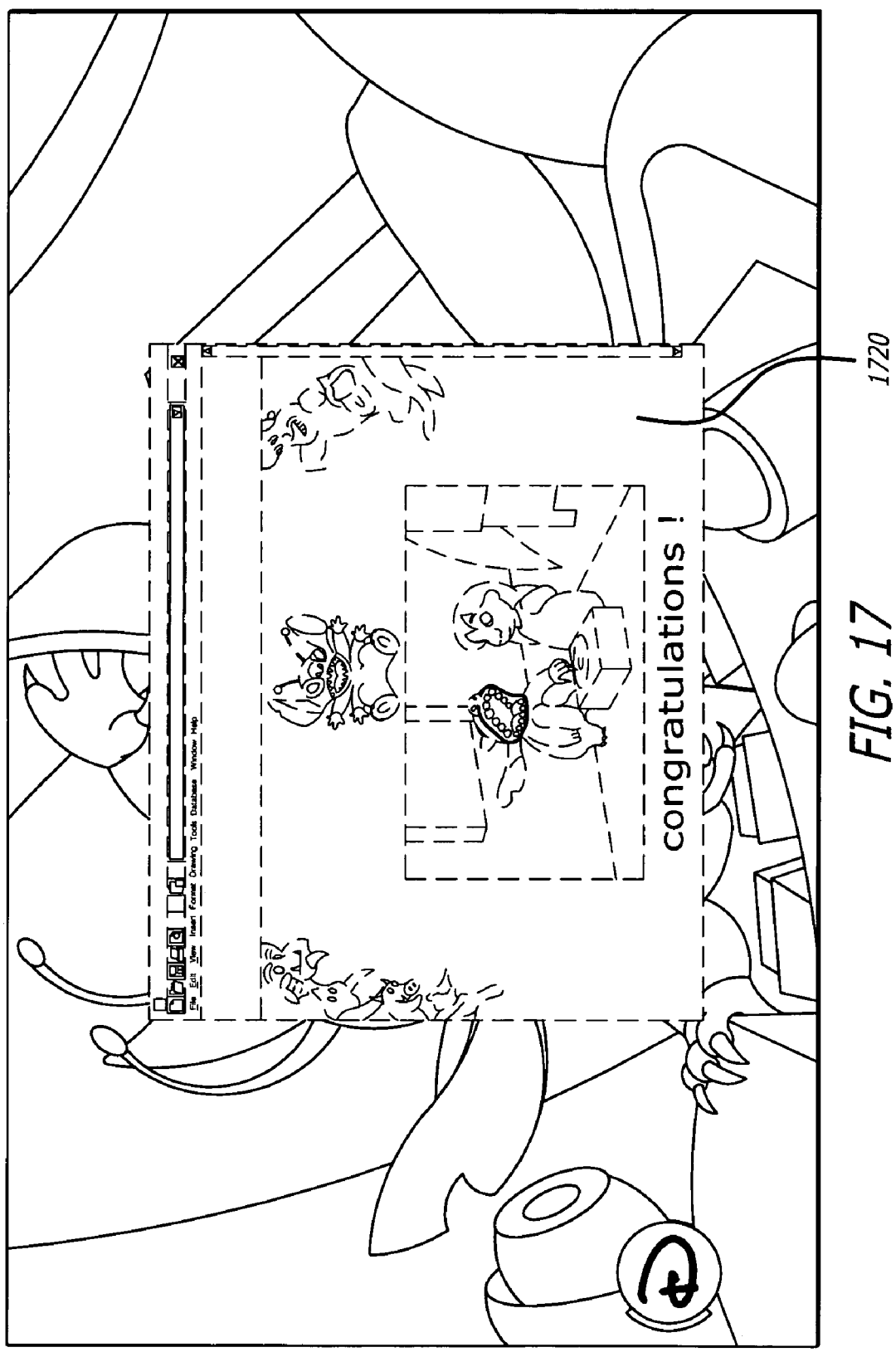
FIG. 17 is an exemplary screenshot according to an embodiment.

Referring to FIG. 14, button 1410 becomes alpha transparent and trailer 1420 appears on the display. Trailer 1420 may be downloaded from the internet, streamed from the media, or retrieved from a storage device. Referring to FIG. 15, trailer 1520 continues to maximize on the display. Referring to FIG. 16, trailer 1620 is fully maximized on the display. Referring to FIG. 17, upon completion of playback of trailer 1720, trailer 1720 becomes alpha transparent and fades away. The user may continue to watch the movie, play the game again, play a different game, or return to the menu.

The system provides audio as well as video to the game. Audio from played segments may be optionally included. Further, audio from the executable file may be included in the graphic overlay or in response to actions by a user.

While the system and method have been described in detail and with reference to specific embodiments thereof, it will be apparent to those skilled in the art that various changes and modifications can be made therein without departing from the spirit and scope thereof. Thus, it is intended that the disclosure cover the modifications and variations provided they fall within the spirit and the scope as described herein.

The invention claimed is:

1. A method for use by a video player using a medium including a video having a plurality of segments in a sequential playback order, the video player having an interactive mode and a non-interactive mode, the method comprising:
   activating the non-interactive mode for playing the video in the sequential playback order by:
      receiving the plurality of segments of the video in the sequential playback order by a media interface of the video player;
      ignoring segment identifiers; and
      displaying each of the plurality of segments of the video in the sequential playback order by the video player;

activating the interactive mode of the video player for playing a game using the video by:
starting to detect the segment identifiers in response to the activating of the interactive mode;
determining whether a user playing the game has successfully hit a target in the game;
identifying, based on the determining, a first segment of the plurality of segments of the video using one or more of the segment identifiers to provide a first identified segment of the video;
skipping a display of the first identified segment of the video;
identifying, based on the determining, a second segment of the plurality of segments of the video using one or more of the segment identifiers to provide a second identified segment of the video; and
displaying the second identified segment of the video.

2. The method of claim 1, wherein the segment identifiers are located in a code within the medium.

3. The method of claim 1, wherein the segment identifiers are located in an edit decision list within the medium.

4. The method of claim 1, wherein the segment identifiers are encoded into the video.

5. The method of claim 1, wherein the segment identifiers are loaded from a computer network.

6. The method of claim 1, wherein activating the interactive mode of the video player is in response to a request by the user.

7. The method of claim 1, wherein identifying the first identified segment of the video is further based on a game score of the user.

8. The method of claim 1, wherein the video from the medium is a linear narrative video.

9. The method of claim 1 further comprising:
identifying one or more segments of the plurality of segments of the video using one or more of the segment identifiers to provide one or more identified segments of the video for displaying in the interactive mode, in response to identifying the first identified segment;
buffering the one or more segments of the plurality of segments for an uninterrupted display of the video in the interactive mode.

10. The method of claim 1 further comprising:
selecting a graphic overlay from the medium in the interactive mode based on an action of the user;
displaying the graphic overlay on the second identified segment of the video in the interactive mode.

11. The method of claim 1, wherein the first segment of the plurality of segments includes one of close-up segment or cutaway segment.

12. The method of claim 1, wherein receiving the video occurs after activating the interactive mode of the video player.

13. A video player operable to provide an interactive mode and a non-interactive mode using a medium including a video having a plurality of segments in a sequential playback order, the video player comprising:
a media interface; and
a processor operable to activate the non-interactive mode of the video player, and further operable to activate the interactive mode of the video player for playing a game using the video;
in the non-interactive mode:
the media interface operable to receive the plurality of segments of the video in the sequential playback order;
the processor operable to ignore the segment identifiers in the non-interactive mode of the video player, and to cause a display of each of the plurality of segments of the video in the sequential playback order by the video player;
in the interactive mode:
the processor operable to start detecting the segment identifiers, in response to the activating of the interactive mode, and to make a determination whether a user playing the game has successfully hit a target in the game;
wherein the processor is operable to identify, based on the determination, a first segment of the plurality of segments of the video using one or more of the segment identifiers to provide a first identified segment of the video, and skip a display of the first identified segment of the video;
wherein the processor is operable to identify, based on the determination, a second segment of the plurality of segments of the video using one or more of the segment identifiers to provide a second identified segment of the video, and cause a display of the second identified segment of the video.

14. The video player of claim 13, wherein the segment identifiers are encoded into the video.

15. The video player of claim 13, wherein the video player is operable to load the segment identifiers from a computer network.

16. The video player of claim 13, wherein the processor is operable to activate the interactive mode of the video player in response to a request by the user.

17. The video player of claim 13, wherein the processor identifies the first identified segment of the video further based on a game score of the user.

18. The video player of claim 13, wherein the video is a linear narrative video.

19. The video player of claim 13, wherein the processor is operable to identify one or more segments of the plurality of segments of the video using one or more of the segment identifiers to provide one or more identified segments of the video for displaying in the interactive mode, in response to identifying the first identified segment;
wherein the processor is further operable to cause a buffering of the one or more segments of the plurality of segments for an uninterrupted display of the video in the interactive mode.

20. A method for use by a video player using a medium including a video having a plurality of segments in a sequential playback order, the video player having an interactive mode and a non-interactive mode, the method comprising:
activating the non-interactive mode for playing the video in the sequential playback order by:
receiving the plurality of segments of the video in the sequential playback order by a media interface of the video player;
ignoring segment identifiers; and
displaying each of the plurality of segments of the video in the sequential playback order by the video player;
activating the interactive mode of the video player for playing a game using the video by:
starting to detect the segment identifiers in response to the activating of the interactive mode;
determining a game score of a user playing the game;
identifying, based on the determining, a first segment of the plurality of segments of the video using one or more of the segment identifiers to provide a first identified segment of the video;

skipping a display of the first identified segment of the video;

identifying, based on the determining, a second segment of the plurality of segments of the video using one or more of the segment identifiers to provide a second identified segment of the video; and displaying the second identified segment of the video.

21. The method of claim 20, wherein the segment identifiers are located in a code within the medium.

22. The method of claim 20, wherein the segment identifiers are located in an edit decision list within the medium.

23. The method of claim 20, wherein the segment identifiers are encoded in the video.

24. The method of claim 20, wherein the segment identifiers are loaded from a computer network.

25. The method of claim 20, wherein activating the interactive mode of the video player is in response to a request by the user.

26. The method of claim 20, wherein the video from the medium is a linear narrative video.

27. The method of claim 20 further comprising:
identifying one or more segments of the plurality of segments of the video using one or more of the segment identifiers to provide one or more identified segments of the video for displaying in the interactive mode, in response to identifying the first identified segment;
buffering the one or more segments of the plurality of segments for an uninterrupted display of the video in the interactive mode.

28. The method of claim 20 further comprising:
selecting a graphic overlay from the medium in the interactive mode based on an action of the user;
displaying the graphic overlay on the second identified segment of the video in the interactive mode.

29. The method of claim 20, wherein the first segment of the plurality of segments includes one of a close-up segment or cutaway segment.

30. The method of claim 20, wherein receiving the video occurs after activating the interactive mode of the video player.

31. A video player operable to provide an interactive mode and a non-interactive mode using a medium including a video having a plurality of segments in a sequential playback order, the video player comprising:
a media interface; and
a processor operable to activate the non-interactive mode of the video player, and further operable to activate the interactive mode of the video player for playing a game using the video;
in the non-interactive mode:
the media interface operable to receive the plurality of segments of the video in the sequential playback order;
the processor operable to ignore the segment identifiers in the non-interactive mode of the video player, and to cause a display of each of the plurality of segments of the video in the sequential playback order by the video player;
in the interactive mode:
the processor operable to start detecting the segment identifiers, in response to the activating of the interactive mode, and to determine a game score of a user playing the game;
wherein the processor is operable to identify, based on the determination, a first segment of the plurality of segments of the video using one or more of the segment identifiers to provide a first identified segment of the video, and skip a display of the first identified segment of the video;
wherein the processor is operable to identify, based on the determination, a second segment of the plurality of segments of the video using one or more of the segment identifiers to provide a second identified segment of the video, and cause a display of the second identified segment of the video.

32. The video player of claim 31, wherein the segment identifiers are encoded into the video.

33. The video player of claim 31, wherein the video player is operable to load the segment identifiers from a computer network.

34. The video player of claim 31, wherein the processor is operable to activate the interactive mode of the video player in response to a request by the user.

35. The video player of claim 31, wherein the video is a linear narrative video.

36. The video player of claim 31, wherein the processor is operable to identify one or more segments of the plurality of segments of the video using one or more of the segment identifiers to provide one or more identified segments of the video for displaying in the interactive mode, in response to identifying the first identified segment;
wherein the processor is further operable to cause a buffering of the one or more segments of the plurality of segments for an uninterrupted display of the video in the interactive mode.

* * * * *